US009602153B2

(12) United States Patent
Takahashi (10) Patent No.: US 9,602,153 B2
(45) Date of Patent: Mar. 21, 2017

(54) RADIO RECEIVING APPARATUS FOR RECEIVING FREQUENCY-MODULATED RADIO SIGNAL (71) Applicant: Panasonic Corporation, Osaka (JP)

(72) Inventor: Kouji Takahashi, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/956,328

(22) Filed: Dec. 1, 2015

(65) Prior Publication Data

US 2016/0182108 A1 Jun. 23, 2016

(30) Foreign Application Priority Data

Dec. 22, 2014 (JP) .................................. 2014-259286

(51) Int. Cl.
| H03M 1/00 | (2006.01) |
| H04B 1/16 | (2006.01) |
| H04L 25/06 | (2006.01) |
| H04L 27/144 | (2006.01) |
| H04B 1/26 | (2006.01) |

(52) U.S. Cl.
CPC ............. *H04B 1/16* (2013.01); *H04L 25/068* (2013.01); *H04L 27/144* (2013.01)

(58) Field of Classification Search
CPC .... H04B 1/0007; H03M 1/185; H03M 1/186; H03M 1/126; H03M 1/1265
USPC ....................................................... 341/123
See application file for complete search history.

(56) References Cited

U.S. PATENT DOCUMENTS 6,515,609 B1 * 2/2003 Moulsley .......... H04W 52/0238
341/155
2013/0223572 A1 * 8/2013 Cheng .................. H04B 1/0007
375/340

FOREIGN PATENT DOCUMENTS

| JP | 8-224119 | 9/1996 |
| JP | 9-130300 | 5/1997 |
| JP | 2004-312146 | 11/2004 |
| JP | 2006-140809 | 6/2006 |
| JP | 2007-243504 | 9/2007 |
| JP | 2014-127910 | 7/2014 |
| WO | 2014/103267 | 7/2014 |

* cited by examiner

*Primary Examiner* — Lee Nguyen
(74) *Attorney, Agent, or Firm* — McDermott Will & Emery LLP (57) ABSTRACT A radio receiving apparatus includes: a radio receiving circuit that frequency-converts a radio signal frequency-modulated with a baseband signal into an intermediate frequency signal; a frequency component detecting circuit that samples the intermediate frequency signal using an over-sampling frequency that is variable and detects a plurality of frequency components in the intermediate frequency signal; and a control circuit that detects a data rate of the baseband signal that is included in the intermediate frequency signal, detects a signal level of the intermediate frequency signal, and determines and sets the over-sampling frequency for the frequency component detecting circuit in accordance with the data rate of the baseband signal and the signal level of the intermediate frequency signal.

10 Claims, 6 Drawing Sheets

| DATA RATE | OSR | | |
|---|---|---|---|
| | RSSI < T1 | T1 ≤ RSSI < T2 | T2 ≤ RSSI |
| 200 kbps | OSRmax | OSRmax/2 | OSRmax/4 |
| 100 kbps | OSRmax/2 | OSRmax/4 | OSRmax/8 |
| 50 kbps | OSRmax/4 | OSRmax/8 | OSRmax/16 |

RADIO RECEIVING APPARATUS FOR RECEIVING FREQUENCY-MODULATED RADIO SIGNAL

BACKGROUND

1. Technical Field

This disclosure relates to radio receiving apparatuses and a radio receiving method for receiving frequency-modulated radio signals, detecting a plurality of frequency components in the received signals, and demodulating the signals. This disclosure also relates to electronic apparatuses including such a radio receiving apparatus.

2. Description of the Related Art

A radio receiving apparatus which demodulates frequency-modulated radio signals includes a frequency component detecting circuit such as an FFT circuit, a DFT circuit, or the like, and detects a plurality of frequency components in a radio signal by using such a frequency component detecting circuit. For examples of such a radio receiving apparatus, see, Japanese Unexamined Patent Application Publication No. 9-130300 and Japanese Unexamined Patent Application Publication No. 2014-127910.

Japanese Unexamined Patent Application Publication No. 9-130300 discloses a multi-frequency shift keying demodulator in a communication system. The multi-frequency shift keying demodulator extracts data signals from modulated signals in accordance with an arithmetic processing result of an arithmetic processing unit which receives a modulated signal and performs high-speed Fourier conversion. The multi-frequency shift keying demodulator according to Japanese Unexamined Patent Application Publication No. 9-130300 performs demodulation accurately at a high speed.

Japanese Unexamined Patent Application Publication No. 2014-127910 discloses a receiving apparatus which receives and demodulates frequency shift keying (FSK) modulated signals. The receiving apparatus includes a frequency component detector detecting frequency components in FSK-modulated digital signals and an operation range control unit controlling an operation range of frequencies for the frequency component detector in accordance with Mark frequency and Space frequency. The receiving apparatus according to the invention of Japanese Unexamined Patent Application Publication No. 2014-127910 achieves a reduction in circuit size and power consumption, while still having an advantage of high-speed processing.

SUMMARY

One non-limiting and exemplary embodiment provides a radio receiving apparatus which receives a frequency-modulated radio signal, detects a plurality of frequency components in the received signal, and demodulates the received signal. The radio receiving apparatus can achieve a reduction in power consumption, while still having a favorable reception sensitivity.

In one general aspect, the techniques disclosed here feature a radio receiving apparatus comprising: a radio receiving circuit that frequency-converts a radio signal frequency-modulated with a baseband signal into an intermediate frequency signal; a frequency component detecting circuit that samples the intermediate frequency signal using an over-sampling frequency that is variable and detects a plurality of frequency components in the intermediate frequency signal; and a control circuit that detects a data rate of the baseband signal that is included in the intermediate frequency signal, detects a signal level of the intermediate frequency signal, and determines and sets the over-sampling frequency for the frequency component detecting circuit in accordance with the data rate of the baseband signal and the signal level of the intermediate frequency signal.

According to an aspect of this disclosure, a radio receiving apparatus can achieve a reduction in power consumption, while still having a favorable reception sensitivity.

It should be noted that general or specific embodiments may be implemented as a device, an apparatus, a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

The power consumption of a radio receiving apparatus depends on various parameters, such as a sampling frequency of a circuit in a radio receiving apparatus. In Japanese Patent No. 3837396, Japanese Unexamined Patent Application Publication No. 2006-140809, and Japanese Unexamined Patent Application Publication No. 2007-243504, a sampling frequency for an analog-to-digital converter and a digital filter in a radio receiving apparatus are changed in order to reduce power consumption.

A frequency component detecting circuit in a radio receiving apparatus samples a received signal with a predetermined over-sampling frequency. When the over-sampling frequency is lowered, the power consumption of the radio receiving apparatus can be reduced, but floor noise increases because a signal with the over-sampling frequency is integrated within a modulation bandwidth of the received signal, which results in deterioration of the minimum reception sensitivity. On the other hand, when the over-sampling frequency is increased, the minimum reception sensitivity is improved, but the power consumption of the radio receiving apparatus increases. In such a circumstance, the present inventor has made intensive studies to provide a radio receiving apparatus which realizes a balanced trade-off between the power consumption and the minimum reception sensitivity and has made this disclosure.

Hereinafter, an embodiment of this disclosure will be described in detail with reference to the drawings. In the accompanying drawings, the same reference numerals indicate the same or like elements.

Figure 1:
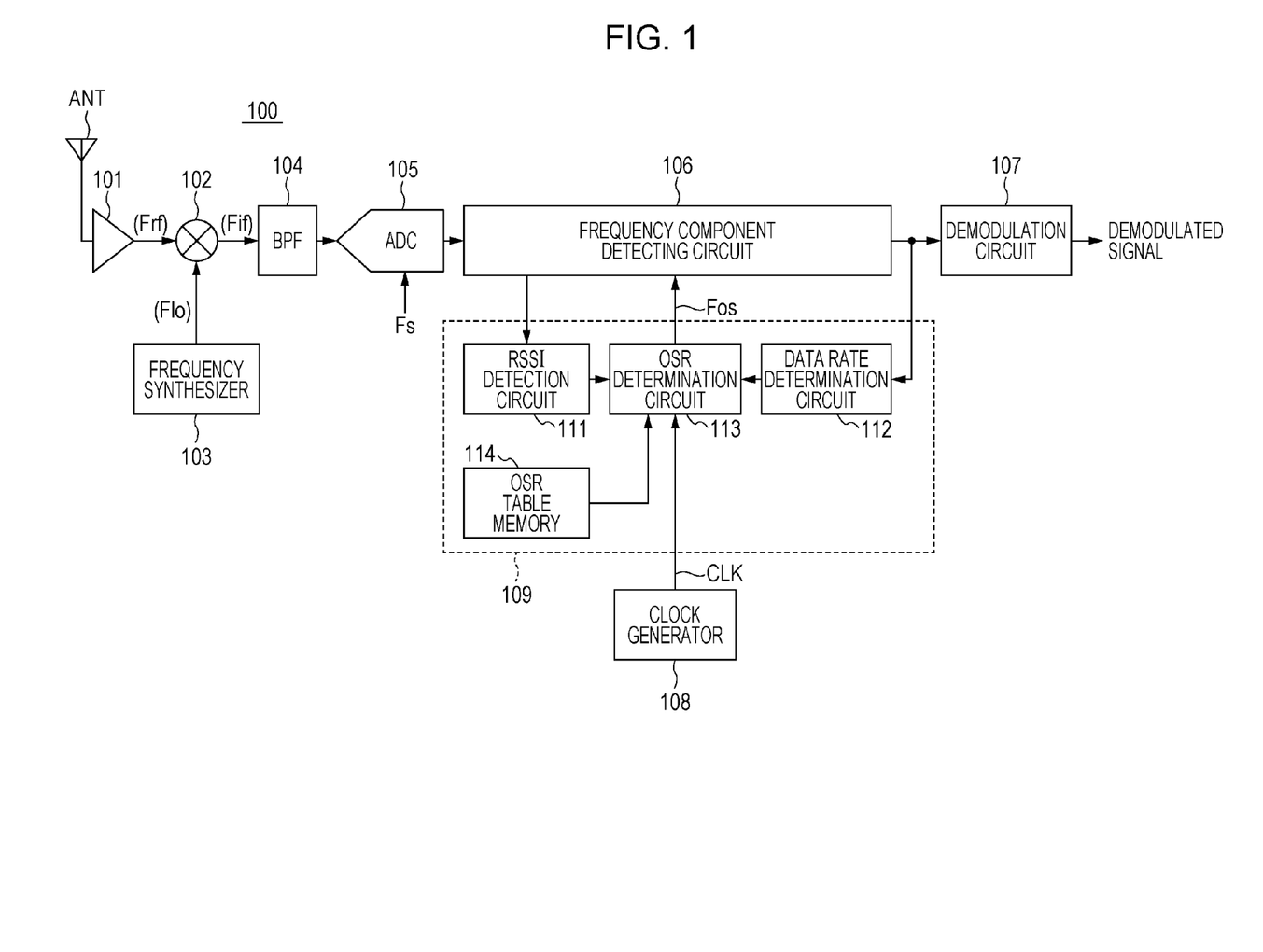
FIG. 1 is a block diagram illustrating a configuration of a radio receiving apparatus according to an embodiment.

FIG. 1 is a block diagram illustrating a configuration of a radio receiving apparatus 100 according to this embodiment. The radio receiving apparatus 100 receives and demodulates a radio signal which has been frequency-modulated (i.e. frequency shift keying (FSK) modulated) with a baseband signal. The radio receiving apparatus 100 includes an antenna ANT, a low-noise amplifier 101, a mixer 102, a frequency synthesizer 103, a band pass filter (BPF) 104, an analog-to-digital converter (ADC) 105, a frequency component detecting circuit 106, a demodulation circuit 107, a clock generator 108, and a control circuit 109.

The antenna ANT receives a radio signal which has been frequency-modulated with a baseband signal. The low-noise amplifier 101, the mixer 102, the frequency synthesizer 103, the BPF 104, and the ADC 105 are included in a radio receiving circuit which frequency-converts the signal received by the antenna ANT into an intermediate frequency signal (i.e., a signal frequency-modulated with a baseband signal). The signal received by the antenna ANT and amplified by the low-noise amplifier 101 has a radio frequency Frf. The frequency synthesizer 103 generates a local oscillation signal having a local oscillation frequency Flo. The mixer 102 multiplies the local oscillation signal by a radio signal having the radio frequency Frf to generate the intermediate frequency signal having an intermediate frequency Fif which is output to the ADC 105 via the BPF 104. The ADC 105 A/D converts the intermediate frequency signal using a sampling frequency Fs.

The frequency component detecting circuit 106 samples the intermediate frequency signal after the A/D conversion using a variable over-sampling frequency Fos. That is, the frequency component detecting circuit 106 converts a digital signal having the sampling frequency Fs and a data bandwidth BW with the intermediate frequency Fif in its center into another digital signal having an over-sampling frequency Fos by decimation or the like. The over-sampling frequency Fos is a frequency greater than at least two times the data rate of the baseband signal. The frequency component detecting circuit 106 detects a plurality of frequency components in the intermediate frequency signal which has been sampled using the over-sampling frequency Fos. The frequency component detecting circuit 106 is, for example, an FFT circuit, a DFT circuit, a short time DFT (ST-DFT) circuit, or the like. In other words, the frequency component detecting circuit 106 executes FFT, DFT, ST-DFT, or the like for an intermediate frequency signal sampled using the over-sampling frequency Fos, and generates a frequency domain signal. Thereby, the frequency component detecting circuit 106 detects a plurality of frequency components. The frequency component detecting circuit 106 outputs the frequency domain signal representing a plurality of detected frequency components to the demodulation circuit 107 and the control circuit 109. The frequency component detecting circuit 106 also outputs, for example, a desired wave intensity signal to the control circuit 109. The desired wave intensity signal represents an intensity of a frequency component in the intermediate frequency signal across a predetermined bandwidth including the intermediate frequency Fif.

The demodulation circuit 107 executes a process such as determination of a sign bit for the frequency domain signal output from the frequency component detecting circuit 106 and outputs a demodulated signal. The demodulation circuit 107 includes, for example, a peak detection circuit, an automatic frequency control circuit, and a bit determination circuit. The peak detection circuit detects a peak value of a signal level of the frequency domain signal and outputs data representing a peak frequency corresponding to the peak value to the automatic frequency control circuit. The automatic frequency control circuit detects a deviation amount of the peak frequency using time shift between the previous peak frequency and the present peak frequency and adjusts frequency data accordingly. The bit determination circuit determines a bit for each symbol on the basis of the frequency data output from the automatic frequency control circuit, decodes the signal into a digital signal having a predetermined bit number, and outputs the demodulated signal.

The clock generator 108 generates a clock signal CLK in the radio receiving apparatus 100.

The control circuit 109 sets the over-sampling frequency Fos or an over-sampling ratio OSR for the frequency component detecting circuit 106. The over-sampling ratio OSR is a ratio of the over-sampling frequency Fos to the data rate of the baseband signal. The control circuit 109 includes a received signal strength indicator (RSSI) detection circuit 111, a data rate determination circuit 112, an OSR determination circuit 113, and an OSR table memory 114.

The RSSI detection circuit 111 detects an RSSI (signal level) of the intermediate frequency signal input to the frequency component detecting circuit 106 using the desired wave intensity signal output from the frequency component detecting circuit 106 and informs the OSR determination circuit 113 of the RSSI. The data rate determination circuit 112 detects a data rate of the baseband signal in the frequency domain signal (i.e., in the intermediate frequency signal input to the frequency component detecting circuit 106) output from the frequency component detecting circuit 106 and informs the OSR determination circuit 113 of the data rate. The data rate determination circuit 112 also identifies a frame of the intermediate frequency signal input to the frequency component detecting circuit 106 using the frequency domain signal, and informs the OSR determination circuit 113 of the frame. The OSR table memory 114 stores a table describing a relationship among the data rate of the baseband signal, the signal level of the intermediate frequency signal, and the over-sampling frequency Fos for the frequency component detecting circuit 106.

The OSR determination circuit 113 determines and sets the over-sampling frequency Fos for the frequency component detecting circuit 106, on the basis of the signal level of the intermediate frequency signal which is detected by the RSSI detection circuit 111, the data rate of the baseband signal which is detected by the data rate determination circuit 112, and the clock signal CLK, with reference to the table in the OSR table memory 114.

Figure 2:
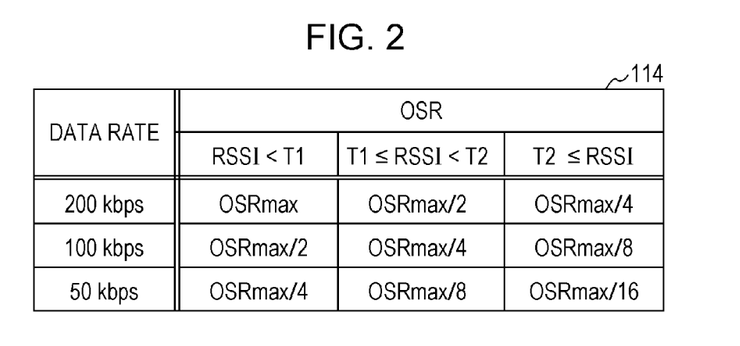
FIG. 2 illustrates contents of an OSR table memory of FIG. 1.

FIG. 2 illustrates contents in the OSR table memory 114 of FIG. 1. The OSR determination circuit 113 uses at least one RSSI threshold value (i.e., a signal level threshold value) for comparison with an RSSI of the intermediate frequency signal which is input to the frequency component detecting circuit 106. In an example of FIG. 2, two RSSI threshold values T1 and T2 are used. The table stored in the OSR table memory 114 includes plural ranges of RSSI for each of data rates. The RSSI ranges are divided by at least one RSSI threshold value and respectively correspond to over-sampling frequencies Fos or over-sampling ratios OSR. In the table of FIG. 2, over-sampling ratios OSR are given. In FIG. 2, "OSRmax" is an over-sampling ratio which corresponds to the predetermined maximum value of the over-sampling frequency Fos (that is, "OSRmax" is the maximum over-sampling ratio). The table in FIG. 2 also includes the maximum over-sampling ratios OSRmax which are divided by a power of two. In an example of FIG. 2, the maximum over-sampling ratio OSRmax is set in a manner such that, for example, when the OSRmax is divided by a power of two such as 64, 128, or 256, a minimum over-sampling ratio (i.e., OSRmax/16) in FIG. 2 is equal to or greater than 4.

The OSR determination circuit 113 compares the signal level of the intermediate frequency signal input to the frequency component detecting circuit 106 with a predetermined RSSI threshold value among at least one RSSI threshold value. When the RSSI of the intermediate frequency signal is equal to or higher than the predetermined RSSI threshold value, the over-sampling frequency Fos lower than a predetermined frequency threshold value corresponding to the RSSI threshold is set for the frequency component detecting circuit 106 by the OSR determination circuit 113. When the RSSI of the intermediate frequency signal is lower than the predetermined RSSI threshold value, the over-sampling frequency Fos higher than the frequency threshold value is set for the frequency component detecting circuit 106 by the OSR determination circuit 113.

Figure 3:
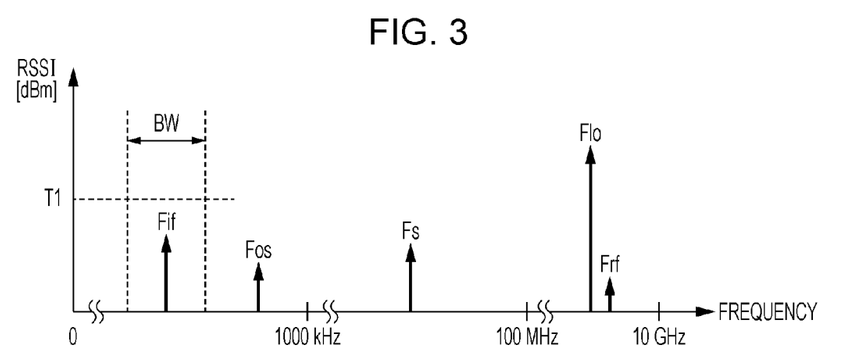
FIG. 3 is a graph illustrating an example of a frequency spectrum in a case where a received signal has a low RSSI in the radio receiving apparatus of FIG. 1.

FIG. 3 is a graph illustrating an example of a frequency spectrum in a case where an RSSI of a received signal is low in the radio receiving apparatus 100 of FIG. 1. The radio frequency Frf is almost equal to the local oscillation frequency Flo and is, for example, a high frequency of several gigahertz. The difference between the radio frequency Frf and the local oscillation frequency Flo is the intermediate frequency Fif, which is several hundreds of kilohertz. The sampling frequency Fs of the ADC 105 is much higher than the intermediate frequency Fif (e.g., 10 to 100 times the intermediate frequency Fif) and is in the range of several megahertz to several tens of megahertz, for example. The data bandwidth BW (hereinafter, simply referred to as the bandwidth BW) of the intermediate frequency signal is equal to twice the data rate of the baseband signal. Therefore, for example, when the data rate of the baseband signal is 100 kbps, the bandwidth BW of the intermediate frequency signal is 200 kHz covering plus and minus 100 kHz of the intermediate frequency Fif. The over-sampling frequency Fos is four times or more the data rate of the baseband signal. For example, when the data rate of the baseband signal is 100 kbps, the over-sampling frequency Fos is set to be 400 kHz, 800 kHz, 1.6 MHz, or the like.

In a case where the RSSI of a radio signal having the radio frequency Frf is low and the RSSI of the intermediate frequency signal having the intermediate frequency Fif is low accordingly, if the over-sampling frequency Fos becomes closer to the intermediate frequency Fif, a signal having the over-sampling frequency Fos is integrated within the bandwidth BW of the intermediate frequency signal. This increases floor noise and the minimum reception sensitivity deteriorates. Therefore, as in FIG. 3, when the RSSI of the intermediate frequency signal having the intermediate frequency Fif is lower than a predetermined RSSI threshold value (e.g., T1), the over-sampling frequency Fos is set to be higher than the predetermined frequency threshold value by the OSR determination circuit 113. Here, the frequency threshold value corresponding to the RSSI threshold value T1 is equal to the sum of the intermediate frequency Fif of the intermediate frequency signal and half of the data bandwidth of the intermediate frequency signal (i.e., BW/2).

Figure 4:
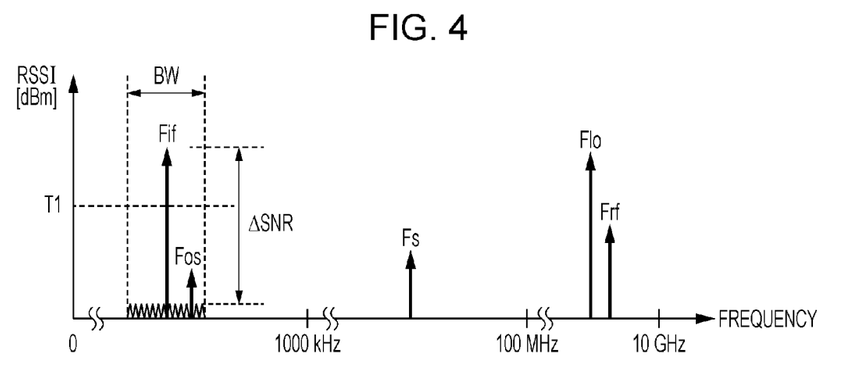
FIG. 4 is a graph illustrating an example of a frequency spectrum in a case where a received signal has a high RSSI in the radio receiving apparatus of FIG. 1.

FIG. 4 is a graph illustrating an example of a frequency spectrum in a case where the RSSI of the received signal is high in the radio receiving apparatus 100 of FIG. 1. In a case where the RSSI of the radio signal having the radio frequency Frf is high and the RSSI of the intermediate frequency signal having the intermediate frequency Fif is high accordingly, even when the over-sampling frequency Fos becomes closer to the intermediate frequency Fif and floor noise occurs within the bandwidth BW of the intermediate frequency signal, the frequency component detecting circuit 106 can correctly detect a plurality of frequency components in the intermediate frequency signal. Therefore, as in FIG. 4, when the RSSI of the intermediate frequency signal having the intermediate frequency Fif is equal to or higher than the predetermined RSSI threshold value (e.g., T1), the over-sampling frequency Fos is set to be lower than the above mentioned frequency threshold value Fif+BW/2 by the OSR determination circuit 113 in order to reduce power consumption.

As described above, the OSR determination circuit 113 sets the variable over-sampling frequency Fos for the frequency component detecting circuit 106 in accordance with the RSSI, which produces the following effects. When the RSSI of the intermediate frequency signal having the intermediate frequency Fif is low, the OSR determination circuit 113 makes the over-sampling frequency Fos high in order to prevent floor noise due to integration of another signal within the bandwidth BW of the intermediate frequency signal; therefore, a favorable minimum reception sensitivity can be maintained. When the RSSI of the intermediate frequency signal having the intermediate frequency Fif is high, the OSR determination circuit 113 makes the over-sampling frequency Fos low in order to reduce the power consumption of the frequency component detecting circuit 106. In the latter case, since the RSSI is high, a sufficient signal-to-noise ratio can still be realized. Therefore, when the RSSI is high, an increase in floor noise, which is caused by integration of a signal having the over-sampling frequency Fos with the bandwidth BW of the intermediate frequency signal, will not become a problem.

In a case where the OSR determination circuit 113 uses a plurality of RSSI threshold values, the OSR determination circuit 113 uses a plurality of frequency threshold values corresponding to respective RSSI threshold values. In such a case, when the RSSI of the radio signal having the radio frequency Frf is low, a frequency threshold value corresponding to one of a plurality of RSSI threshold values is set to be equal to the above described frequency threshold value, Fif+BW/2.

An OSR determination process executed by the OSR determination circuit 113 in FIG. 1 will be described with reference to FIG. 5 to FIG. 7.

Figure 7:
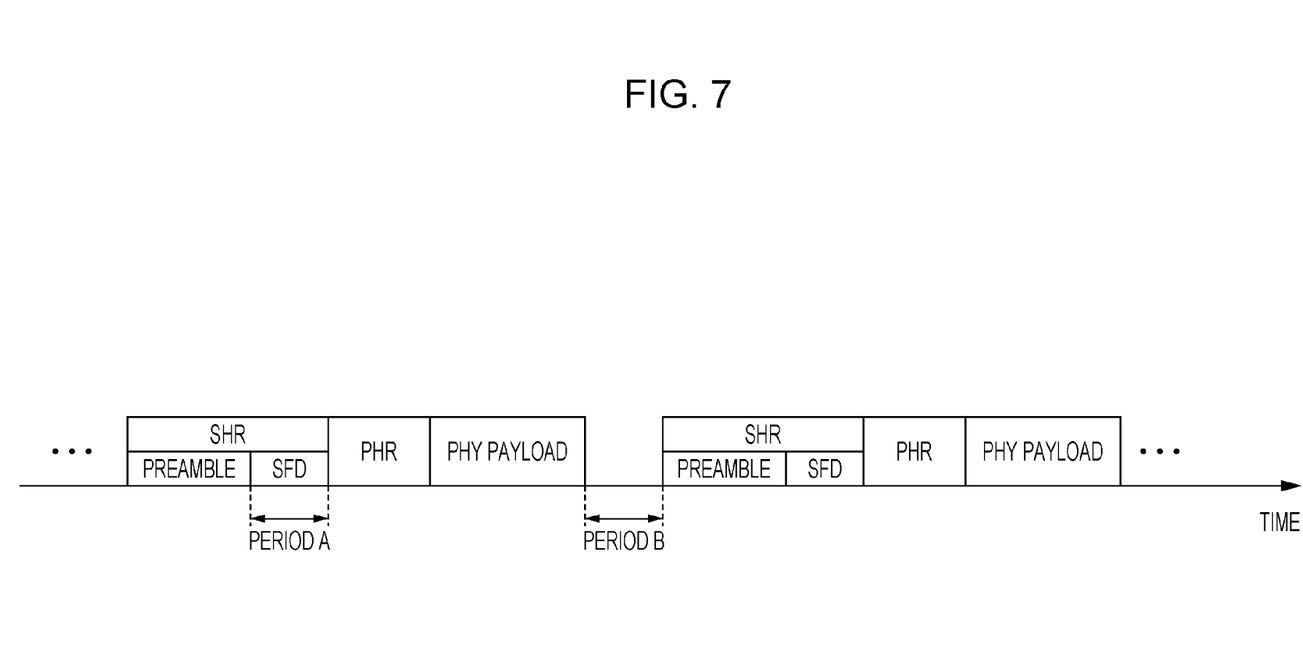
FIG. 7 illustrates an example of a format of a frame in a signal received by the radio receiving apparatus of FIG. 1.

FIG. 7 illustrates an example of a format of a frame in a received signal received by the radio receiving apparatus 100 in FIG. 1. In the radio receiving apparatus 100 in FIG. 1, the intermediate frequency signal has a predetermined format of a frame including a header and a payload. The format of a frame in FIG. 7 complies with IEEE 802.15.4 g, but a signal received by the radio receiving apparatus 100 in FIG. 1 may have a frame of another standard. One frame includes an SHR, a PHR, and a PHY payload. An SHR is a synchronization header which includes a preamble and a start frame delimiter (SFD). A PHR is a header of PHY.

Figure 5:
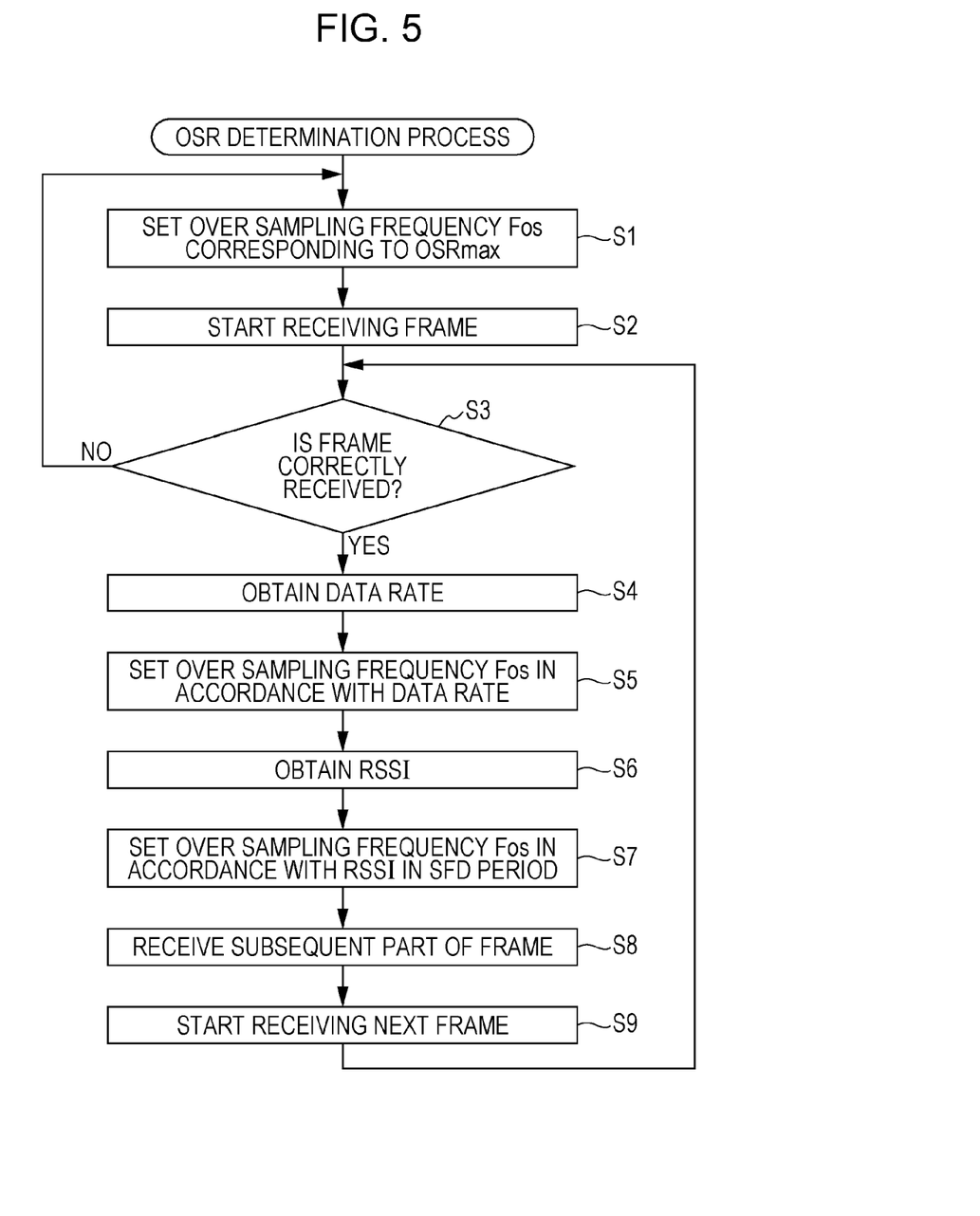
FIG. 5 is a flowchart illustrating an OSR determination process executed by an OSR determination circuit of FIG. 1.

FIG. 5 is a flowchart illustrating an OSR determination process executed by the OSR determination circuit 113 of FIG. 1. In the OSR determination process in FIG. 5, the OSR determination circuit 113 detects the data rate of the baseband signal and the signal level of the intermediate frequency signal and changes the over-sampling frequency Fos for the frequency component detecting circuit 106 in a period of a header (e.g., a period A of FIG. 7) in one frame.

In Step S1, the OSR determination circuit 113 sets the over-sampling frequency Fos corresponding to the maximum over-sampling ratio OSRmax for the frequency component detecting circuit 106. In Step S2, the frequency component detecting circuit 106 starts receiving a frame of the intermediate frequency signal. In Step S3, the OSR determination circuit 113 determines whether the frame is correctly received or not. If YES, the process proceeds to Step S4 and if NO, the process returns to the Step S1.

In the Step S4, the OSR determination circuit 113 obtains a data rate from the data rate determination circuit 112. When the data rate determination circuit 112 synchronizes with a preamble bit in the frame, the data rate determination circuit 112 calculates the data rate in accordance with the preamble bit. In Step S5, the OSR determination circuit 113 refers to the table stored in the OSR table memory 114 and sets the over-sampling frequency Fos for the frequency component detecting circuit 106 in accordance with the data rate. In the Step S5, the OSR determination circuit 113 sets the over-sampling frequency Fos for the frequency component detecting circuit 106. The over-sampling frequency Fos corresponds to the maximum over-sampling ratio among over-sampling ratios in the table stored in the OSR table memory 114 which are associated with the data rate calculated by the data rate determination circuit 112.

In Step S6, the OSR determination circuit 113 obtains the RSSI from the RSSI detection circuit 111. The RSSI detection circuit 111 detects the RSSI in accordance with the preamble bit in the frame. In Step S7, the OSR determination circuit 113 sets the over-sampling frequency Fos in accordance with the RSSI in the SFD period of the current frame.

In Step S8, the frequency component detecting circuit 106 receives a subsequent part of the frame. In Step S9, the frequency component detecting circuit 106 starts receiving the next frame.

The OSR determination process in FIG. 5 can be employed in a case where the OSR determination circuit 113 divides a clock signal CLK by an integer N to generate the over-sampling frequency Fos. In this case, the OSR determination circuit 113 can complete detection of the data rate and the signal level and change in the over-sampling frequency Fos during one frame; therefore, it is possible to promptly respond to a change in a radio-environment.

Figure 6:
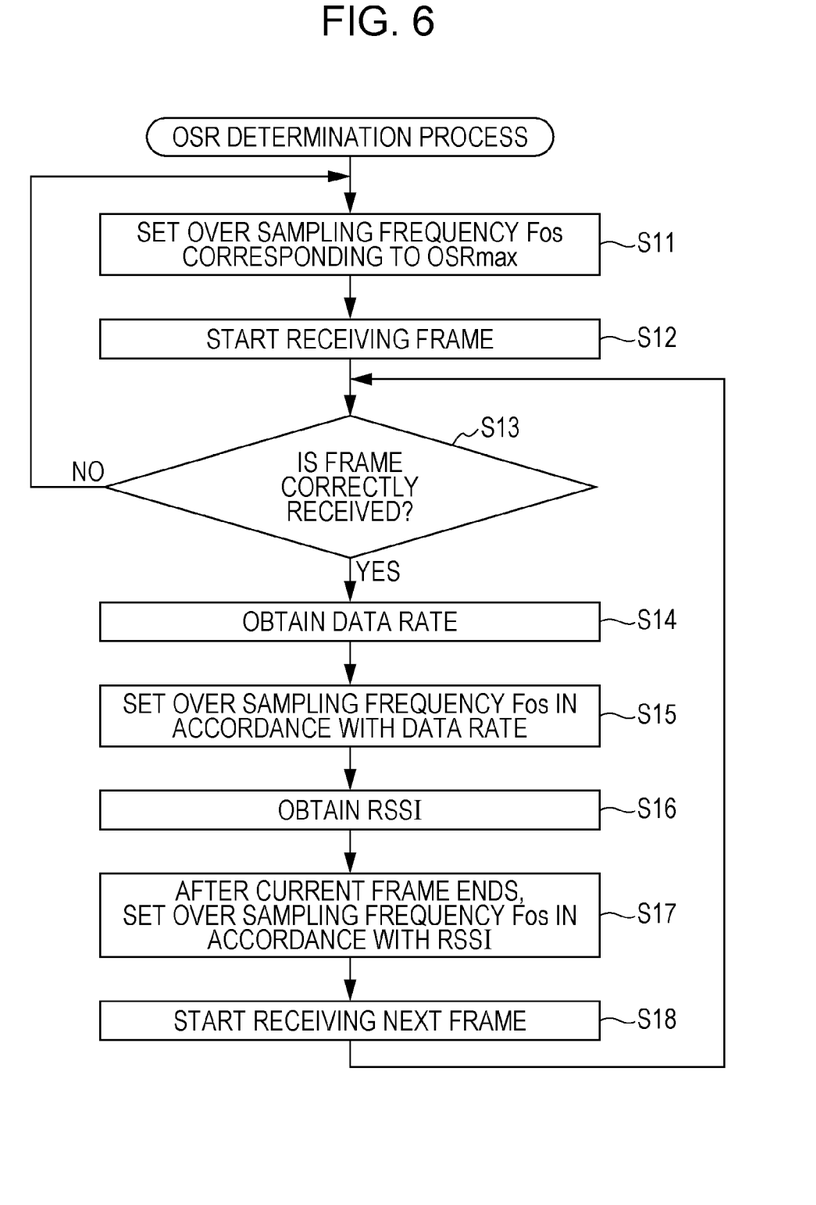
FIG. 6 is a flowchart illustrating a modification example of an OSR determination process executed by the OSR determination circuit of FIG. 1.

FIG. 6 is a flowchart illustrating a modification example of the OSR determination process executed by the OSR determination circuit 113 of FIG. 1. In the OSR determination process in FIG. 6, the OSR determination circuit 113 detects the data rate of the baseband signal and the signal level of the intermediate frequency signal in one frame period, and changes the over-sampling frequency Fos of the frequency component detecting circuit 106 in a period between the current frame and the next frame (e.g., a period B in FIG. 7). Steps S11 to S16 of FIG. 6 are same as or similar to the Steps S1 to S6 of FIG. 5. In Step S17, after the current frame ends, the OSR determination circuit 113 sets the over-sampling frequency Fos in accordance with the RSSI. In Step S18, the frequency component detecting circuit 106 starts receiving the next frame.

The OSR determination process of FIG. 6 can be employed in a case where, for example, the OSR determination circuit 113 divides the clock signal CLK by a fraction to generate the over-sampling frequency Fos. When the over-sampling frequency Fos has a fractional division ratio of the clock signal CLK, the OSR determination circuit 113 cannot complete the change of the over-sampling frequency Fos in a period of one frame. In such a case, the over-sampling frequency Fos is changed in a period between frames, as in FIG. 6. In such a manner, the OSR determination circuit 113 can be prevented from affecting demodulation of the payload in the frame due to a change of the over-sampling frequency Fos.

In the OSR determination process in FIG. 5 and FIG. 6, after the Step S9 of FIG. 5 and the Step S18 of FIG. 6, a process of detecting the data rate and RSSI and setting the over-sampling frequency Fos is repeated. Thus, the over-sampling frequency Fos is set for every frame. Note that, alternatively, the over-sampling frequency Fos may be set once when the radio receiving apparatus 100 starts operation or may be performed once for every several frames.

The Step S3 of FIG. 5 and the step S13 of FIG. 6 are effective in a case where the radio receiving apparatus 100 is a movable device. When the radio receiving apparatus 100 is fixed and a stable radio-environment is provided, the Step S3 of FIG. 5 and the step S13 of FIG. 6 may be omitted.

Figure 8:
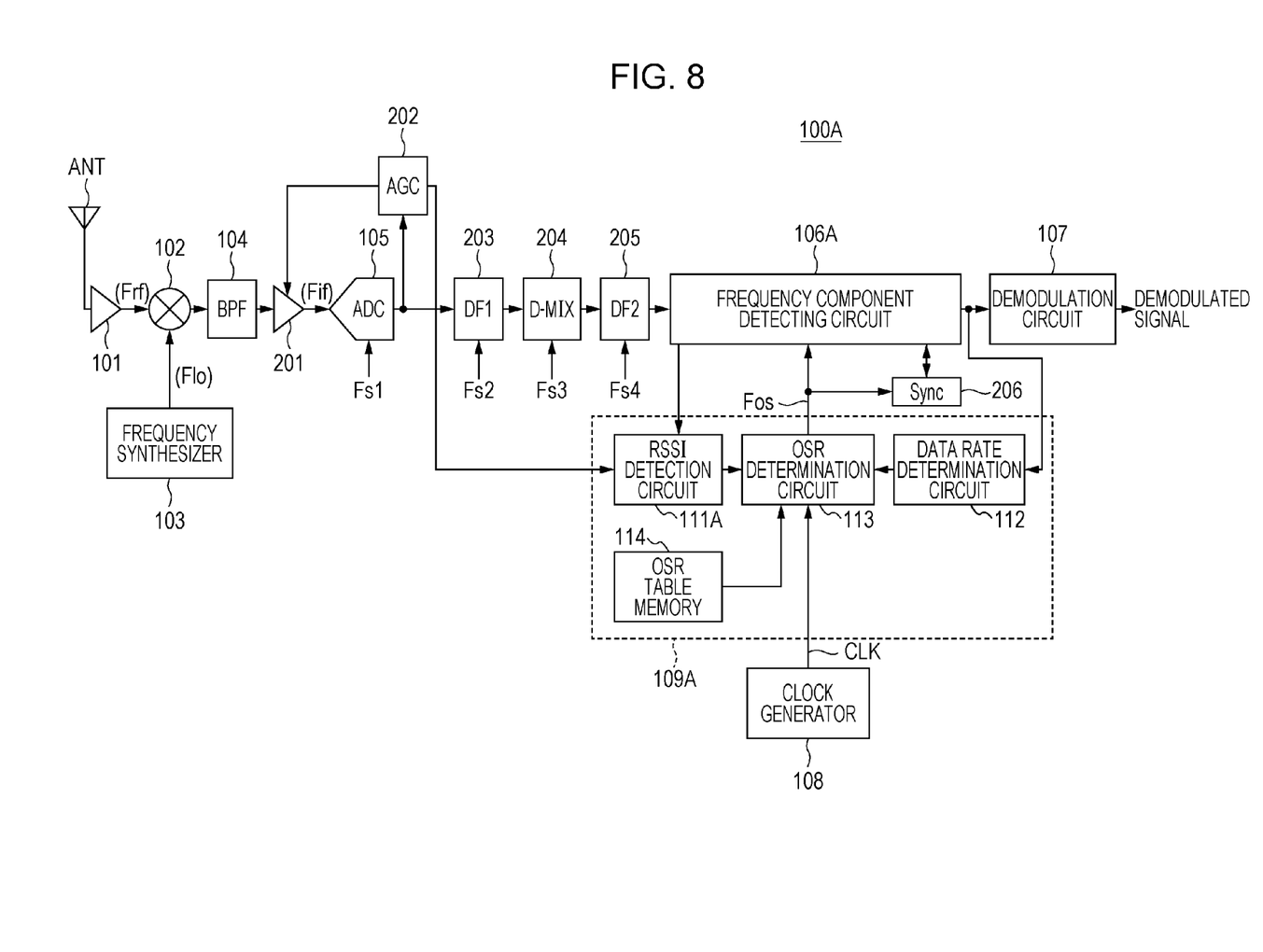
FIG. 8 illustrates a block diagram illustrating a configuration of a radio receiving apparatus according to a modification example.

FIG. 8 illustrates a block diagram illustrating a configuration of a radio receiving apparatus 100A according to a modification example. The radio receiving apparatus 100A includes the antenna ANT, the low-noise amplifier 101, the mixer 102, the frequency synthesizer 103, the BPF 104, a variable gain amplifier 201, an automatic gain control (AGC) circuit 202, the ADC 105, a decimation filter (DF1) 203, a down mixer (D-MIX) 204, a decimation filter (DF2) 205, a frequency component detecting circuit 106A, the demodulation circuit 107, a synchronization circuit (Sync) 206, the clock generator 108, and a control circuit 109A.

The variable gain amplifier 201 amplifies an input signal under control of a gain control signal from the AGC circuit 202 to make the signal have a predetermined constant amplitude. The gain control signal from the AGC circuit 202 includes, for example, information on levels of signals and noises. An output signal from the ADC 105 is output to the D-MIX 204 via the decimation filter (DF1) 203 to be subjected to low-frequency conversion. An output signal from the D-MIX 204 is sent to the frequency component detecting circuit 106A via the decimation filter (DF2) 205. The ADC 105, the decimation filter (DF1) 203, the D-MIX 204, and the decimation filter (DF2) 205 respectively process input signals having sampling frequencies Fs1 to Fs4, which are different from one another. The synchronization circuit (Sync) 206 generates a synchronization signal on the basis of a signal having the over-sampling frequency Fos and outputs the synchronization signal to the frequency component detecting circuit 106A. Other elements in the radio receiving apparatus 100A of FIG. 8 are same as or similar to those in the radio receiving apparatus 100 in FIG. 1.

The control circuit 109A includes an RSSI detection circuit 111A, the data rate determination circuit 112, the OSR determination circuit 113, and the OSR table memory 114. The RSSI detection circuit 111A detects the RSSI of the intermediate frequency signal in accordance with a desired wave intensity signal sent from the frequency component detecting circuit 106A or the gain control signal from the AGC circuit 202. Other elements in the control circuit 109A of FIG. 8 are similar to those in the control circuit 109 of FIG. 1.

Note that the block diagrams of FIG. 1 and FIG. 8 illustrate examples and therefore the radio receiving apparatus according to this embodiment may include other elements.

Note that the radio receiving apparatus according to this embodiment may be one or more integrated circuits.

A radio receiving apparatus according to this embodiment can be applied to various kinds of electronic apparatuses which need to reduce power consumption and keep a favorable reception sensitivity. The electronic apparatus includes a radio receiving apparatus according to this embodiment and a signal processing circuit which operates on the basis of a radio signal which is received by the radio receiving apparatus. The electronic apparatus is, for example, a specified low power radio station that serves as a sensor for a smart meter, for home energy management system (HEMS), for medical use, and for other uses. For example, by using the radio receiving apparatus according to this embodiment, a wireless sensor network can be established.

Note that although the over-sampling ratio OSR is included in each box in the table of FIG. 2, a corresponding over-sampling frequency Fos may be included, instead of over-sampling ratio OSR.

Hereinafter, effects realized by the radio receiving apparatus according to this embodiment will be described.

According to this embodiment, a radio receiving apparatus that detects a plurality of frequency components in a frequency-modulated radio signal and demodulates the frequency-modulated radio signal can achieve a reduction in power consumption, while still having a favorable reception sensitivity.

By setting a suitable over-sampling frequency for a frequency component detecting circuit in accordance with a data rate and a signal level of a received signal, a reduction in power consumption can be achieved, while a favorable reception sensitivity is maintained. In order to realize such an effect, a table representing a relationship between the data rate of the baseband signal, the signal level of the intermediate frequency signal, and the over-sampling frequency of the frequency component detecting circuit is stored in advance. According to the radio receiving apparatus of this embodiment, power consumption can be further reduced compared to the inventions of Japanese Unexamined Patent Application Publication No. 9-130300 and Japanese Unexamined Patent Application Publication No. 2014-127910.

Note that an RSSI is also monitored in a conventional radio receiving apparatus (e.g., the invention of Japanese Unexamined Patent Application Publication No. 2014-127910); therefore, the radio receiving apparatus according to this embodiment does not require a great increase in circuit size.

There has been a problem such that a signal having the over-sampling frequency Fos in the frequency component detecting circuit propagates through upper-stage circuits such as the low-noise amplifier 101, the mixer 102, and the frequency synthesizer 103. If the over-sampling frequency Fos is close to the intermediate frequency Fif, the propagated signal having the over-sampling frequency Fos becomes noise which cannot be removed by a filter. With the radio receiving apparatus of this embodiment, when a signal having the over-sampling frequency Fos propagates through the low-noise amplifier 101, the mixer 102, the frequency synthesizer 103, and the like, since the over-sampling frequency Fos is set to be higher than the frequency threshold value (Fif+BW/2), the propagated signal having the over-sampling frequency Fos can be removed by the BPF 104.

Conventionally, inventions in which a sampling frequency of an analog-to-digital converter or a filter in a radio receiving apparatus is changed are known. With a radio receiving apparatus of this embodiment, a sampling frequency for a frequency component detecting circuit is changed; therefore, a novel radio receiving apparatus which can reduce power consumption while still having a favorable reception sensitivity can be provided.

According to an embodiment of this disclosure, the present disclosure can include the following aspects.

A radio receiving apparatus according to a first aspect of this disclosure is a radio receiving apparatus comprising: a radio receiving circuit that frequency-converts a radio signal frequency-modulated with a baseband signal into an intermediate frequency signal; a frequency component detecting circuit that samples the intermediate frequency signal using an over-sampling frequency that is variable and detects a plurality of frequency components in the intermediate frequency signal; and a control circuit that detects a data rate of the baseband signal that is included in the intermediate frequency signal, detects a signal level of the intermediate frequency signal, and determines and sets the over-sampling frequency for the frequency component detecting circuit in accordance with the data rate of the baseband signal and the signal level of the intermediate frequency signal.

A radio receiving apparatus according to a second aspect of this disclosure is the radio receiving apparatus according to the first aspect, in which the control circuit compares the signal level of the intermediate frequency signal with a signal level threshold value selected from one or more signal level threshold values. When the signal level is equal to or higher than the signal level threshold value, an over-sampling frequency that is lower than a predetermined frequency threshold value corresponding to the signal level threshold value is set for the frequency component detecting circuit. When the signal level is lower than the signal level threshold value, an over-sampling frequency that is higher than the predetermined frequency threshold value is set for the frequency component detecting circuit.

A radio receiving apparatus according to a third aspect of this disclosure is the radio receiving apparatus according to the second aspect, in which the frequency threshold value corresponding to the signal level threshold value is equal to a sum of the intermediate frequency of the intermediate frequency signal and half of a data bandwidth of the intermediate frequency signal.

A radio receiving apparatus according to a fourth aspect of this disclosure is the radio receiving apparatus according to the second or third aspect, in which the control circuit includes a memory that stores a table describing a relationship among the data rate of the baseband signal, the signal level of the intermediate frequency signal, and the over-sampling frequency of the frequency component detecting circuit. The table indicates a plurality of over-sampling frequencies corresponding to plural ranges of signal levels for each data rate, the plural ranges of signal levels being divided by the at least one signal level threshold value.

A radio receiving apparatus according to a fifth aspect of this disclosure is the radio receiving apparatus according to any one of the first to fourth aspects, in which the intermediate frequency signal includes a frame with a predetermined format that includes a header and a payload. The control circuit detects the data rate of the baseband signal and the signal level of the intermediate frequency signal, and changes the over-sampling frequency for the frequency component detecting circuit, in a period of a header in one frame.

A radio receiving apparatus according to a sixth aspect of this disclosure is the radio receiving apparatus according to any one of the first to fourth aspects, in which the intermediate frequency signal includes a frame with a format that includes a header and a payload. The control circuit detects the data rate of the baseband signal and the signal level of the intermediate frequency signal in a period for a header in one frame, and changes the over-sampling frequency for the frequency component detecting circuit in a period between the one frame and a following frame.

A radio receiving apparatus according to a seventh aspect of this disclosure is the radio receiving apparatus according to any one of the first to sixth aspects, in which the radio receiving apparatus includes at least one integrated circuit.

An electronic apparatus according to an eighth aspect of this disclosure includes the radio receiving apparatus according to any one of the first to seventh aspects, and a signal processing circuit that operates in accordance with a signal that is received by the radio receiving apparatus.

A radio receiving apparatus according to a ninth aspect of this disclosure is the radio receiving apparatus according to the first aspect, in which the control circuit compares a signal level of the intermediate frequency signal with at least one signal level threshold value and sets the over-sampling frequency corresponding to a result of the comparison, for the frequency component detecting circuit.

A radio receiving apparatus according to a tenth aspect of this disclosure is the radio receiving apparatus according to the first aspect, in which the control circuit determines which of a plurality of ranges the signal level of the intermediate frequency signal corresponds to, and sets the over-sampling frequency corresponding to a result of the determination, for the frequency component detecting circuit.

A radio receiving method according to an eleventh aspect of this disclosure is a radio receiving method for a radio receiving apparatus, wherein the radio receiving apparatus comprises: a radio receiving circuit that frequency-converts a radio signal frequency-modulated with a baseband signal into an intermediate frequency signal; a frequency component detecting circuit that samples the intermediate frequency signal using an over-sampling frequency that is variable and detects a plurality of frequency components in the intermediate frequency signal; and a control circuit. The radio receiving method includes detecting, by the control circuit, a data rate of the baseband signal that is included in the intermediate frequency signal, detecting, by the control circuit, a signal level of the intermediate frequency signal, and determining and setting, by the control circuit, the over-sampling frequency in accordance with the data rate of the baseband signal and the signal level of the intermediate frequency signal, for the frequency component detecting circuit.

By using a radio receiving apparatus according to this disclosure, for example, a multi-frequency shift keying demodulator which can reduce power consumption while still having a favorable reception sensitivity can be provided.

Since a radio receiving apparatus according to this disclosure can reduce power consumption while still having a favorable reception sensitivity, the radio receiving apparatus can be favorably used, for example, in the field of a specified low power radio station in a wireless sensor network.

In the present disclosure, all or a part of any of blocks in the block diagrams shown in FIG. 1 or 8 may be implemented as one or more of electronic circuits including, but not limited to, a semiconductor device, a semiconductor integrated circuit (IC) or an LSI. The LSI or IC can be integrated into one chip, or also can be a combination of plural chips. For example, functional blocks other than a memory may be integrated into one chip. The name used here is LSI or IC, but it may also be called system LSI, VLSI (very large scale integration), or ULSI (ultra large scale integration) depending on the degree of integration. A Field Programmable Gate Array (FPGA) that can be programmed after manufacturing an LSI or a reconfigurable logic device that allows reconfiguration of the connection or setup of circuit cells inside the LSI can be used for the same purpose.

Further, it is also possible that all or a part of the functions or operations of the blocks are implemented by executing software. In such a case, the software is recorded on one or more non-transitory recording media such as a ROM, an optical disk or a hard disk drive, and when the software is executed by a processor, the software causes the processor together with peripheral devices to execute the functions specified in the software. A system or apparatus may include such one or more non-transitory recording media on which the software is recorded and a processor together with necessary hardware devices such as an interface.

What is claimed is:

1. A radio receiving apparatus comprising:
    a radio receiving circuit that frequency-converts a radio signal frequency-modulated with a baseband signal into an intermediate frequency signal;
    a frequency component detecting circuit that samples the intermediate frequency signal using an over-sampling frequency that is variable and detects a plurality of frequency components in the intermediate frequency signal; and
    a control circuit that detects a data rate of the baseband signal that is included in the intermediate frequency signal, detects a signal level of the intermediate frequency signal, and determines and sets the over-sampling frequency for the frequency component detecting circuit in accordance with the data rate of the baseband signal and the signal level of the intermediate frequency signal,
    wherein the control circuit compares the signal level of the intermediate frequency signal with a signal level threshold value selected from one or more signal level threshold values,
    wherein when the signal level is equal to or higher than the signal level threshold value, an over-sampling frequency that is lower than a predetermined frequency threshold value corresponding to the signal level threshold value is set for the frequency component detecting circuit, and
    wherein when the signal level is lower than the signal level threshold value, an over-sampling frequency that is higher than the predetermined frequency threshold value is set for the frequency component detecting circuit.

2. The radio receiving apparatus according to claim 1, wherein the frequency threshold value corresponding to the signal level threshold value is equal to a sum of the intermediate frequency of the intermediate frequency signal and half of a data bandwidth of the intermediate frequency signal.

3. The radio receiving apparatus according to claim 1,
    wherein the control circuit includes a memory that stores a table describing a relationship among the data rate of the baseband signal, the signal level of the intermediate frequency signal, and the over-sampling frequency of the frequency component detecting circuit, and wherein the table indicates a plurality of over-sampling frequencies corresponding to plural ranges of signal levels for each data rate, the plural ranges of signal levels being divided by the at least one signal level threshold value.

4. The radio receiving apparatus according to claim 1,
wherein the intermediate frequency signal includes a frame with a predetermined format that includes a header and a payload, and
wherein the control circuit detects the data rate of the baseband signal and the signal level of the intermediate frequency signal, and changes the over-sampling frequency for the frequency component detecting circuit, in a period of a header in one frame.

5. The radio receiving apparatus according to claim 1,
wherein the intermediate frequency signal includes a frame with a format that includes a header and a payload, and
wherein the control circuit detects the data rate of the baseband signal and the signal level of the intermediate frequency signal in a period for a header in one frame, and changes the over-sampling frequency for the frequency component detecting circuit in a period between the one frame and a following frame.

6. The radio receiving apparatus according to claim 1, wherein the radio receiving apparatus is constructed as at least one integrated circuit.

7. The radio receiving apparatus according to claim 1, wherein the control circuit compares a signal level of the intermediate frequency signal with at least one signal level threshold value and sets the over-sampling frequency corresponding to a result of the comparison, for the frequency component detecting circuit.

8. The radio receiving apparatus according to claim 1, wherein the control circuit determines which of a plurality of ranges the signal level of the intermediate frequency signal corresponds to, and sets the over-sampling frequency corresponding to a result of the determination, for the frequency component detecting circuit.

9. An electronic apparatus, comprising:
a radio receiving apparatus that receives a radio signal frequency-modulated with a baseband signal; and
a signal processing circuit that operates in accordance with a signal that is received by the radio receiving apparatus,
wherein the radio receiving apparatus incudes
a radio receiving circuit that frequency-converts the received signal into an intermediate frequency signal,
a frequency component detecting circuit that samples the intermediate frequency signal using an over-sampling frequency that is variable and detects a plurality of frequency components in the intermediate frequency signal, and
a control circuit that detects a data rate of the baseband signal that is included in the intermediate frequency signal, detects a signal level of the intermediate frequency signal, and determines and sets the over-sampling frequency for the frequency component detecting circuit in accordance with the data rate of the baseband signal and the signal level of the intermediate frequency signal,
wherein the control circuit compares the signal level of the intermediate frequency signal with a signal level threshold value selected from one or more signal level threshold values,
wherein when the signal level is equal to or higher than the signal level threshold value, an over-sampling frequency that is lower than a predetermined frequency threshold value corresponding to the signal level threshold value is set for the frequency component detecting circuit, and
wherein when the signal level is lower than the signal level threshold value, an over-sampling frequency that is higher than the predetermined frequency threshold value is set for the frequency component detecting circuit.

10. A radio receiving method for a radio receiving apparatus, wherein the radio receiving apparatus comprises:
a radio receiving circuit that frequency-converts a radio signal frequency-modulated with a baseband signal into an intermediate frequency signal;
a frequency component detecting circuit that samples the intermediate frequency signal using an over-sampling frequency that is variable and detects a plurality of frequency components in the intermediate frequency signal; and
a control circuit, and
wherein the radio receiving method includes:
detecting, by the control circuit, a data rate of the baseband signal that is included in the intermediate frequency signal,
detecting, by the control circuit, a signal level of the intermediate frequency signal, and
determining and setting, by the control circuit, the over-sampling frequency in accordance with the data rate of the baseband signal and the signal level of the intermediate frequency signal, for the frequency component detecting circuit,
wherein, in the determining and setting, the control circuit compares the signal level of the intermediate frequency signal with a signal level threshold value selected from one or more signal level threshold values,
wherein, in the determining and setting, when the signal level is equal to or higher than the signal level threshold value, an over-sampling frequency that is lower than a predetermined frequency threshold value corresponding to the signal level threshold value is set for the frequency component detecting circuit, and
wherein, in the determining and setting, when the signal level is lower than the signal level threshold value, an over-sampling frequency that is higher than the predetermined frequency threshold value is set for the frequency component detecting circuit.

* * * * *